Feb. 22, 1927.

J. L. RAY 1,618,296

TURBINE BLADE LASHING

Filed Aug. 1, 1925

J. L. Ray
INVENTOR

BY *D. C. Davis*

ATTORNEY

Patented Feb. 22, 1927.

1,618,296

UNITED STATES PATENT OFFICE.

JAMES L. RAY, OF SWARTHMORE, PENNSYLVANIA, ASSIGNOR TO WESTINGHOUSE ELECTRIC & MANUFACTURING COMPANY, A CORPORATION OF PENNSYLVANIA.

TURBINE-BLADE LASHING.

Application filed August 1, 1925. Serial No. 47,582.

My invention relates to elastic fluid turbines, more particularly to the blading thereof, and has for its object the provision of an efficient lashing means therefor which shall be effective to unite the blades into a sturdy, unitary structure and minimize vibration thereof, while at the same time being simple of design and easy of manufacture and application.

Figure 1:
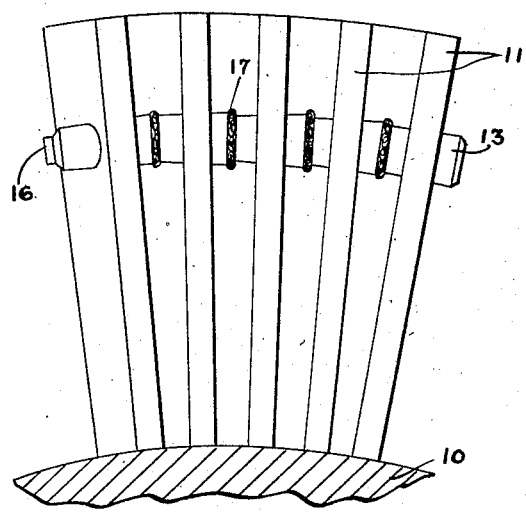
Figure 2:
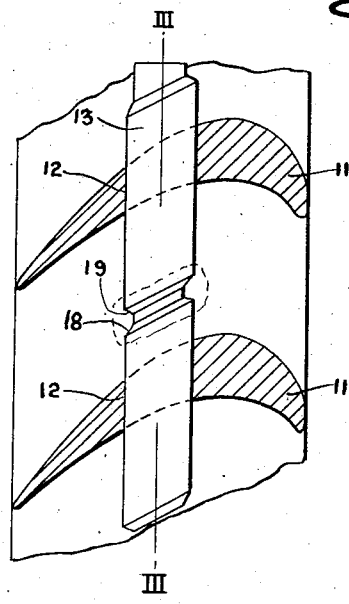
Figure 3:
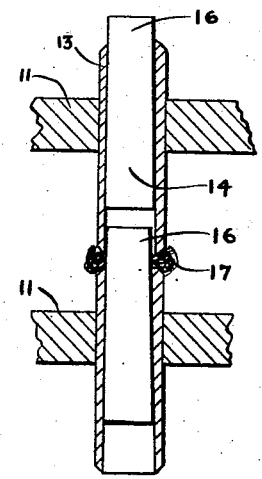

Apparatus embodying features of my invention is illustrated in the accompanying drawings forming a part of this specification in which Fig. 1 is a fragmentary view showing a turbine blade carrying element having a plurality of blades mounted thereon with my improved lashing means applied thereto; Fig. 2 is a partial sectional view, in plan, of two blades having my improved lashing means applied thereto and drawn to a larger scale than Fig. 1; and Fig. 3 is a vertical sectional view taken along the line III—III of Fig. 2.

Turbine blade lashing as heretofore known to me, has usually comprised some form of continuous lashing member, usually in the form of a wire, inserted in aligned holes provided in a row of blades and secured to the blades. The resulting structure minimizes vibration of the blades by adding rigidity thereto and by raising the natural period of vibration thereof. Various methods have been employed for securing the lashing wire to the blades, those most commonly used being by soldering or brazing the lashing member to the blades, by distorting the metal of the lashing member on each side of the blade, or by a combination of both of these methods. Difficulties have been encountered, however, with both of the methods heretofore employed. Where the lashing wire is soldered or brazed to the blade, the melting point of the solder or spelter employed in the process is at such a high temperature that it has been found to have an undesired effect upon the physical properties of the blades. Where the lashing wire is secured to the blade by distortion of the metal in the lashing wire, it has at times been found difficult to secure a sufficiently tight engagement between the lashing wire and the blade to insure a permanent juncture therebetween, particularly where the material of the lashing member has a coefficient of linear expansion widely different from that of the blade material.

In accordance with my invention I have overcome both of the before-mentioned difficulties by providing a lashing for turbine blades comprising individual lashing members applied by expansion to the blades during the process of manufacture and which are joined together, upon assembly of blades in a row, at a point intermediate the blades. Being carried out remotely from the blade surface, any of the processes of fusion of metal have no undesired effect upon the blades. The individual lashing members are tubular in form and are tightly pressed or inserted into suitable holes provided in the blades so as to extend forwardly and rearwardly of the blades and occupy a predetermined position in said holes. The tubular members are furthermore securely fastened into the holes by driving a forcing member, or frustro-conically shaped member, into the tubes and expanding them into the holes. The forcing members are also preferably driven to predetermined positions in the tubular members and extend at one end beyond the tubular members into which they are inserted so as to enter the end of an adjacent tubular member. Upon assembly, the tubular members and forcing members are joined together by soldering, brazing or welding. In carrying out the invention, the insertion of the tubular members and forcing members in the blades in the shop during the process of manufacture permits the work to be carried out very quickly and by simple automatic machinery as will be well understood by those skilled in the art.

Referring now to the drawings for a better understanding of my invention, I show in Fig. 1 at 10 a turbine blade carrying element, for example a turbine rotor, having a plurality of blades 11—11 mounted thereon. The blades 11—11 are provided with a series of aligned holes 12—12 (Figs. 2 and 3) for the application of lashing members. Into each of the holes 12 is inserted an individual lashing member in the form of a tube or sleeve 13 which is preferably adjusted to a predetermined position in the blade and projects from the front and back faces of each blade. In order to secure the sleeves in the blades 11, I insert a frustro-conically or cylindrically shaped member 14 into each sleeve which expands the tubular member 13 and forces it into further tight engagement with its associated blade 11. The member 14 is preferably also driven to a predetermined position in the tubular member 13 and extends beyond said tubular member at one end so as to have a portion 16 extending into the open end of another member 13 when the blades are assembled in a row. These members are so proportioned as to accommodate several changes of pitch, this latter being a variable condition always found in practice due to the variable heights of blade and drum diameters used, and fit any shape of blade.

Upon assembly of the blades, with the portion 16 of the member 14 extending into an associated member 13, a very convenient pocket for carrying out the process of soldering, brazing or welding is formed. The individual members are then joined together as at 17 so that the sleeves and the members 14 are joined into a sturdy, unitary structure. In order to better carry out the process of joining the members together, the ends of the sleeves 13—13 are preferably made bevelled as shown at 18 and 19. When the lashing members are finally joined together, the point of juncture is located where its moment of resistance to bending is at a maximum.

From the foregoing it will be apparent that I have devised an improved lashing means for turbine blades comprising individual lashing members wedged into individual blades and joined together intermediate the blades.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. A lashing for a turbine blade provided with a hole therein, comprising a hollow tube member inserted in said hole and having a portion extending from the blade, and a wedge member within said tube member for expanding it within the hole into fixed engagement with the blade.

2. A lashing for a turbine blade provided with a hole therein, comprising a hollow tube member inserted in said hole and having a portion extending from the blade, and a frustro-conical wedge member driven into the tube member for expanding it within the hole into fixed engagement with the blade.

3. The combination with a turbine blade having a hole therein, of a lashing member therefor comprising a hollow tube member inserted in the hole so as to have a portion thereof on each side of the blade, and a wedge member driven into said tube member to expand it within the hole and retain it in fixed engagement with the blade.

4. The combination with a turbine blade having a hole therein, of a lashing therefor comprising a hollow tube member inserted in the hole with projecting portions of its ends on each side of the blade, a forcing member driven into the hollow portion of the tube member expanding it within the hole into fixed engagement with the blade and with a portion of said forcing member projecting beyond one end of said tube member.

5. In a turbine, the combination of a plurality of blades in a row, lashing for said blades comprising tubular members inserted into holes provided in each of the blades and having equal projecting portions thereof on each side of the blade, and frustro-conical wedge members driven into the hollow portion of each of the tubular members for expanding the tubular members into fixed engagement with the blades, each of said wedge members projecting beyond one end of its associated tubular member and interlocking with the hollow portion of the adjacent tubular member, said tubes and wedge members at point of interlocking being joined together by fusion of metal.

6. In a row of turbine blades, a lashing therefor comprising tube members inserted in holes in the blades, wedge members inserted in each of the tubes at a predetermined position therein, and means for joining the tubes and the wedge members intermediate adjacent blades in a row.

7. In a row of turbine blades, a lashing therefor comprising tube members of equal length inserted in holes provided in the blades, wedge members inserted in each of the tubes at a predetermined position therein, and means for joining the tubes and wedge members intermediate adjacent blades in a row.

8. In a row of turbine blades, a lashing therefor comprising tube members of equal length inserted in holes provided in the blades, wedge members of equal length inserted in each of the tubes at a predetermined position therein, and means for joining the tubes and the wedge members intermediate adjacent blades in a row.

9. In a row of turbine blades, a lashing therefor comprising, expansible tube members inserted in holes in the blades, wedge members inserted in each of the tubes at a predetermined position therein, and means for joining the tubes and the wedge members intermediate adjacent blades in a row.

10. In a row of turbine blades, a lashing therefor comprising expansible tube members of equal length inserted in holes in the blades, wedge members inserted in each of the tubes at a predetermined position therein, and means for joining the tubes and the wedge members intermediate adjacent blades in a row.

11. In a row of turbine blades, a lashing therefor comprising expansible tube members inserted in holes in the blades, wedge members of equal length inserted in each of the tubes at a predetermined position therein, and means for joining the tubes and the wedge members intermediate adjacent blades in a row.

12. In a row of turbine blades, a lashing therefor comprising expansible tube members of equal length inserted in holes provided in the blades, wedge members of equal length inserted in each of the tubes at a predetermined position therein, and means for joining the tubes and wedge members at a point intermediate adjacent blades in a row by fusion of metal.

13. In a row of turbine blades, a lashing therefor comprising tube members having bevelled ends inserted in holes provided in the blades, wedge members of equal length inserted in each of the tubes at a predetermined position therein, and means for joining the tubes and the wedge members at a point intermediate adjacent blades in a row by fusion of metal.

14. In a row of turbine blades, a lashing therefor comprising expansible tube members having bevelled ends, wedge members of equal length inserted in each of the tubes at a predetermined position therein, and means for joining the tubes and wedge members at a point intermediate adjacent blades in a row by fusion of metal.

15. In a row of turbine blades, a lashing therefor comprising tube members inserted in holes in the blades, a wedge member inserted in each tube and the wedge member of one tube projecting into an adjacent tube, and means for joining the tubes intermediate adjacent blades in a row.

In testimony whereof, I have hereunto subscribed my name this twenty-first day of July, 1925.

JAMES L. RAY.